United States Patent
Sienel

(10) Patent No.: US 6,898,941 B2
(45) Date of Patent: May 31, 2005

(54) SUPERCRITICAL PRESSURE REGULATION OF VAPOR COMPRESSION SYSTEM BY REGULATION OF EXPANSION MACHINE FLOWRATE

(75) Inventor: Tobias H. Sienel, Manchester, CT (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 10/462,423

(22) Filed: Jun. 16, 2003

(65) Prior Publication Data

US 2004/0250556 A1 Dec. 16, 2004

(51) Int. Cl.[7] .............. F25B 9/00; F25B 41/00; F25B 49/00; F28B 9/00
(52) U.S. Cl. .............. 62/87; 62/172; 62/498; 62/196.2
(58) Field of Search .............. 62/87, 402, 498, 62/172, 196.2, 196.1

(56) References Cited

U.S. PATENT DOCUMENTS

| | | | | |
|---|---|---|---|---|
| 3,321,930 A | * | 5/1967 | La Fleur | 62/228.4 |
| 3,934,424 A | * | 1/1976 | Goldsberry | 62/87 |
| 5,191,776 A | * | 3/1993 | Severance et al. | 62/513 |
| 5,245,836 A | * | 9/1993 | Lorentzen et al. | 62/174 |
| 5,819,554 A | * | 10/1998 | Glen | 62/498 |
| 6,185,956 B1 | * | 2/2001 | Brasz | 62/498 |
| 6,321,564 B1 | | 11/2001 | Yamanaka et al. | |
| 6,595,024 B1 | * | 7/2003 | Tang et al. | 62/498 |
| 6,644,062 B1 | * | 11/2003 | Hays | 62/402 |
| 6,694,763 B2 | * | 2/2004 | Howard | 62/228.3 |
| 2003/0177782 A1 | * | 9/2003 | Gopalnarayanan et al. | 62/505 |

FOREIGN PATENT DOCUMENTS

| | | |
|---|---|---|
| EP | 1 067 342 | 1/1997 |
| EP | 0 787 891 | 8/1997 |
| EP | 1 046 869 | 10/2000 |
| EP | 1 376 030 | 1/2004 |
| JP | 2000 234814 | 8/2000 |

OTHER PUBLICATIONS

International Search Report dated Dec. 1, 2004.

* cited by examiner

*Primary Examiner*—William C. Doerrler
(74) *Attorney, Agent, or Firm*—Carlson, Gaskey & Olds

(57) ABSTRACT

The expansion machine flowrate of a vapor compression system is regulated to directly control the supercritical pressure in the high pressure component of the transcritical system. The expansion machine is directly linked to a recompressor which recompresses the vapor phase of the expanded flow. By controlling the flowrate of the recompressor with a first valve, the flowrate of the expansion machine can be controlled to control the massflow rate through the expansion machine and therefore the high pressure of the system.

23 Claims, 4 Drawing Sheets

… ……… ……… ……… ……… ……… ……… ……… ……… ……… ………

SUPERCRITICAL PRESSURE REGULATION OF VAPOR COMPRESSION SYSTEM BY REGULATION OF EXPANSION MACHINE FLOWRATE

BACKGROUND OF THE INVENTION

The present invention relates generally to a system for regulating the high pressure component of a transcritical vapor compression system by controlling the flowrate through an expansion machine or expander.

Chlorine containing refrigerants have been phased out in most of the world due to their ozone destroying potential. Hydrofluoro carbons (HFCs) have been used as replacement refrigerants, but these refrigerants still have high global warming potential. "Natural" refrigerants, such as carbon dioxide and propane, have been proposed as replacement fluids. Unfortunately, there are problems with the use of many of these fluids as well. Carbon dioxide has a low critical point, which causes most air conditioning systems utilizing carbon dioxide to run partially above the critical point, or to run transcritical, under most conditions. The pressure of any subcritical fluid is a function of temperature under saturated conditions (when both liquid and vapor are present). However, when the temperature of the fluid is higher than the critical temperature (supercritical), the pressure becomes a function of the density of the fluid.

When a vapor compression system is run transcritical, it is advantageous to regulate the high pressure component of the system. By regulating the high pressure of the system, the capacity and/or efficiency of the system can be controlled and optimized.

In the prior art, the high pressure component of a vapor compression system has been regulated by adjusting a valve located at the exit of the gas cooler, allowing for control of system capacity and efficiency. Suction line heat exchangers and storage tanks have also been employed to increase system capacity and efficiency.

SUMMARY OF THE INVENTION

A transcritical vapor compression system includes a compressor, a gas cooler, an expansion machine, and an evaporator. Refrigerant is circulated though the closed circuit cycle. Preferably, carbon dioxide is used as the refrigerant. As carbon dioxide has a low critical point, systems utilizing carbon dioxide as a refrigerant usually require the vapor compression system to run transcritical. When the system is run transcritical, it is advantageous to regulate the high pressure component of the vapor compression system to control and optimize the capacity and/or efficiency of the system.

The expansion machine is a work recovery device which extracts energy from the expansion process. The expansion machine increases the efficiency of the system by providing a more isentropic expansion process. Increasing the flowrate through the expansion machine causes more mass to leave the high pressure part of the system, decreasing the instantaneous refrigerant mass in the high pressure part of the system, decreasing the high pressure in the system. Decreasing the flowrate through the expansion machine causes less mass to leave the high pressure part of the system, increasing the instantaneous refrigerant mass in the high pressure part of the system, increasing the high pressure in the system.

In one example, after expansion, the refrigerant flow enters a separator tank. The vapor phase of the expanded flow is recompressed in a recompressor and injected into the high pressure part of the system. Preferably, the refrigerant is injected at the input of the gas cooler. The recompressor is directly linked to the expansion machine. By controlling the flowrate through the recompressor, the flowrate through the expansion machine, and therefore the high pressure component of the system, is controlled. A first valve positioned between the expanded flow and the recompressor regulates the amount of flow provided to the recompressor and the flowrate through the recompressor. The high pressure in the gas cooler is monitored by a control. As the pressure in the gas cooler changes, the control adjusts the first valve to achieve the optimal system pressure.

If the first valve is closed, the amount of flow provided to the recompressor decreases, decreasing the load which the recompressor applies on the expansion machine and increasing the flowrate through the expansion machine which causes the supercritical pressure in the system to decrease. If the first valve is opened, the amount of flow provided to the recompressor increases, increasing the load which the recompressor applies on the expansion machine, decreasing the flowrate through the expansion machine and increasing the supercritical pressure in the system.

The system can further include a second valve positioned between the expanded flow and the evaporator to operate as an economized cycle. The second valve controls the superheat at the suction of the compressor to vary the mass flowrate through the evaporator. The cool vapor flow bypasses the evaporator through a vapor bypass line to cool the suction of the compressor.

In another example, the refrigerant from the suction of the compressor is recompressed in the compressor. Alternately, refrigerant from the gas cooler exchanges heat with refrigerant from the recompressor in a heat exchanger. This refrigerant from the heat exchanger is then recompressed. These alternative examples each include provisions for control of the flowrate through the expansion machine to control and optimize the capacity and/or efficiency of the system.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
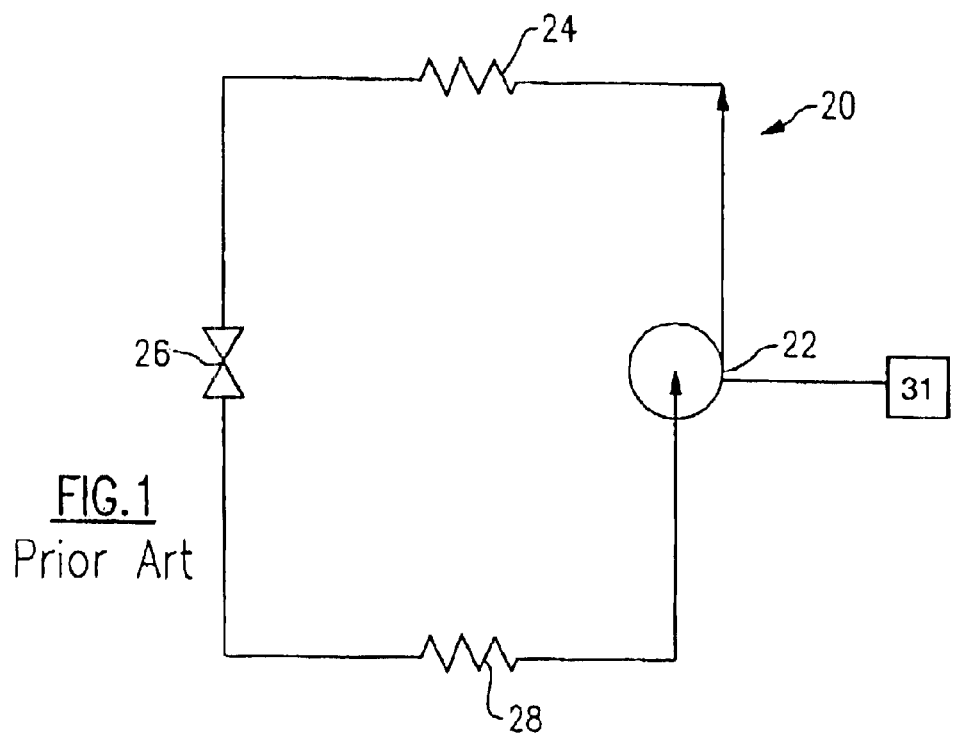
FIG. 1 illustrates a schematic diagram of a prior art vapor compression system.

FIG. 1 illustrates a prior art vapor compression system 20 including a compressor 22 having a motor 31, a heat rejecting heat exchanger (a gas cooler in transcritical cycles) 24, an expansion valve 26, and a heat accepting heat exchanger (an evaporator) 28.

Refrigerant circulates though the closed circuit system 20. Preferably, carbon dioxide is used as the refrigerant. While carbon dioxide is illustrated, other refrigerants may be used. Because carbon dioxide has a low critical point, systems utilizing carbon dioxide as a refrigerant usually require the vapor compression system 20 to run transcritical. When the system 20 is run transcritical, it is advantageous to regulate the high pressure component of the vapor compression system 20. By regulating the high pressure of the system 20, the capacity and/or efficiency of the system 20 can be controlled and optimized.

Figure 2:
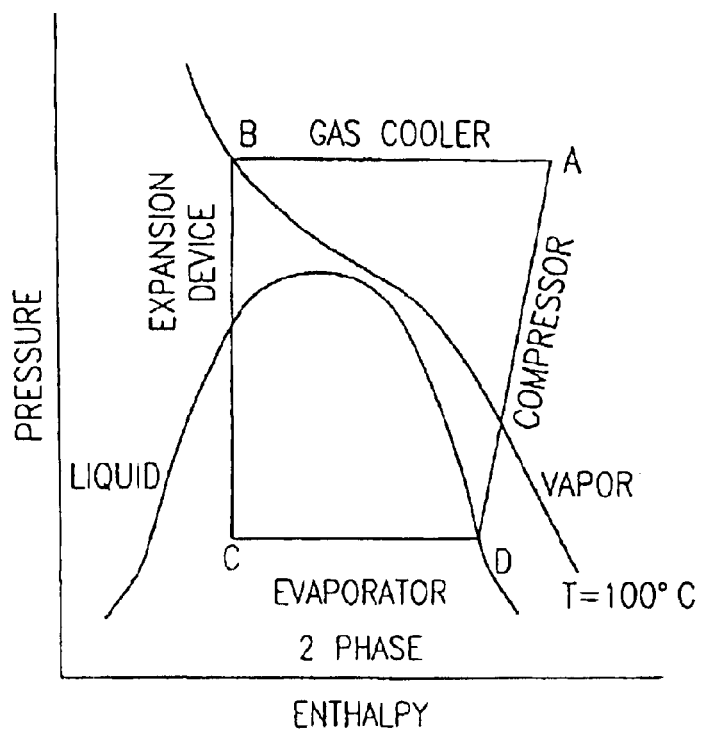
FIG. 2 illustrates a thermodynamic diagram of a transcritical vapor compression system.

The refrigerant exits the compressor 22 at high pressure and enthalpy, shown by point A in FIG. 2. As the refrigerant flows through the gas cooler 24 at high pressure, it loses heat and enthalpy, exiting the gas cooler 24 with low enthalpy and high pressure, indicated as point B. As the refrigerant passes through the expansion valve 26, the pressure drops isenthalpicly, shown by point C. After expansion, the refrigerant passes through the evaporator 28 and exits at a high enthalpy and low pressure, represented by point D. After the refrigerant passes through the compressor 22, it is again at high pressure and enthalpy, completing the cycle.

The supercritical pressure in the high pressure component of the system 20 is a function of temperature and density. Density is a function of both mass and volume. The volume inside the high pressure component of the system 21 is typically constant and the temperature of the high pressure part of the system 20 is generally not controlled to maximize system 20 efficiency. Therefore, the supercritical pressure of a transcritical system 20 is controlled by controlling the mass of refrigerant inside the high pressure component of the system 20. The mass in the high pressure component of the system 20 is a function of the mass flowrate exiting the compressor 22 and the mass flowrate entering the expansion valve 26. Therefore, controlling the flowrate through the expansion valve 26 can directly control the supercritical pressure in the high pressure component of the transcritical system 20.

Figure 3A:
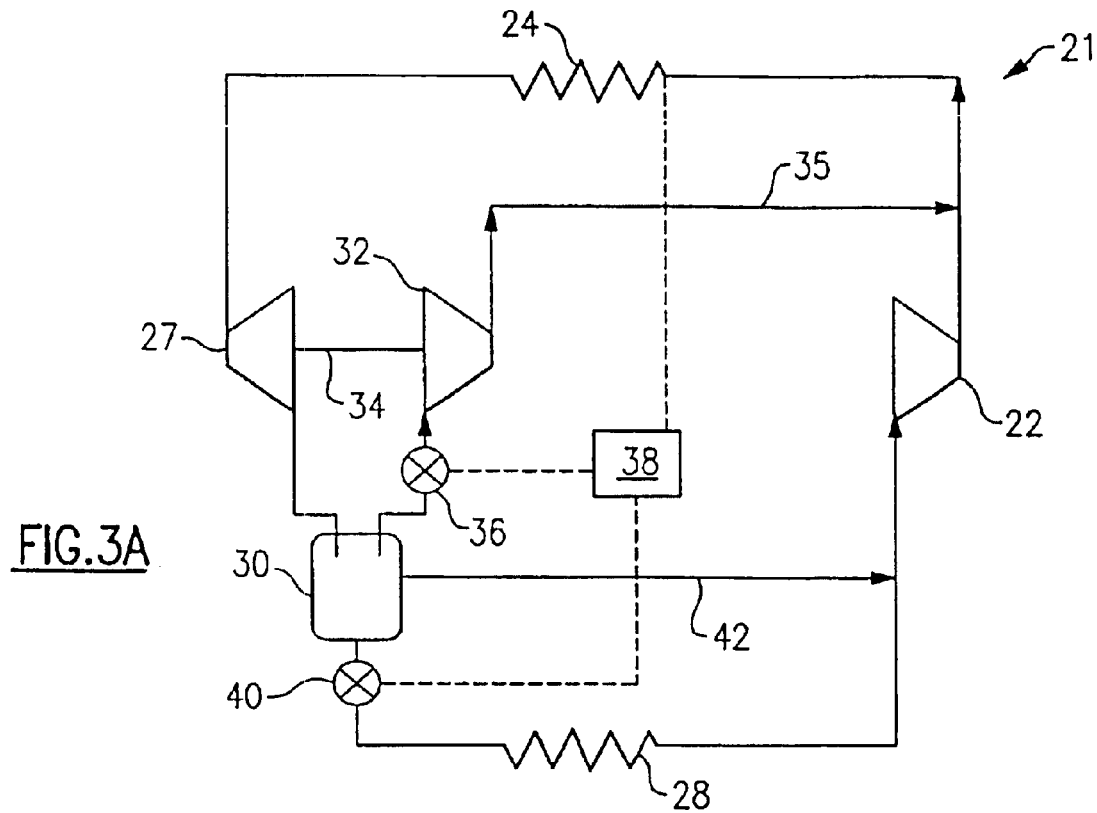
FIG. 3a illustrates a schematic diagram of a first example of the transcritical vapor compression system including a recompressor to regulate the expander machine flowrate to control the high pressure component of the system.

FIG. 3a schematically illustrates a first example of the system 21 of the present invention. The system 21 includes an expansion machine 27. The expansion machine 27 is a work recovery device which extracts energy from the expansion process. The amount of energy available for extraction in the expansion machine 27 is a product of the flowrate through the expansion machine 27, the enthalpy difference between isenthalpic (constant enthalpy) and isentropic (constant entropy) expansion between the inlet and exit pressure of the expansion machine 27, and the expansion efficiency. The product is generally a function of the pressure difference between the high pressure and the low pressure and the mass flowrate through the expansion machine 27.

The expansion machine 27 increases the efficiency of the system 21 by providing a more isentropic (constant entropy) expansion process, as opposed to a isenthalpic (constant enthalpy) expansion process that is provided by use of the prior art expansion valve 26 or orifice. This more isentropic expansion process decreases the enthalpy of the refrigerant entering the evaporator 28, allowing more heat to be absorbed in the evaporator 28 and thus increasing the cooling capacity of the system 21. The expansion machine 27 additionally increases the efficiency of the system 21 by capturing the energy of expansion and using this energy to offset normal system energy requirements.

By regulating the flowrate through the expansion machine 27, the high pressure in the system 21 can be controlled. Increasing the flowrate of refrigerant through the expansion machine 27 causes more mass to leave the high pressure part of the system 21, decreasing the instantaneous refrigerant mass in the high pressure part of the system 21 and the high pressure in the system 21. Decreasing the flowrate through the expansion machine 27 causes less mass to leave the high pressure part of the system 21, increasing the instantaneous refrigerant mass in the high pressure part of the system 21 and the high pressure in the system 21.

The flowrate of refrigerant through the expansion machine 27 is a function of the speed of expansion machine 27, the pressure difference between the high pressure part and the low pressure parts of the system 21, and the displacement of the expansion machine 27 if the expansion machine 27 is a displacement type expansion machine 27, such as a piston, rotary, scroll, or screw type expansion machine. By regulation of any of the above functions, the high pressure part of the system 21 can be regulated. For example, increasing the speed of the expansion machine 27 allows more refrigerant flow to pass through the expansion machine 27, decreasing the instantaneous refrigerant mass in the high pressure part of the system 21 and the pressure in the high pressure part of the system 21. Decreasing the speed of the expansion machine 27 allows less refrigerant to pass through the expansion machine 27, increasing the refrigerant mass in the high pressure part of the system and increasing the pressure in the high pressure part of the system 21. An operating frequency of the expansion machine 27 can also control the expansion machine 27 flowrate.

In another example, increasing the displacement of the expansion machine 27 allows more refrigerant flow to pass through the expansion machine 27, decreasing the instantaneous refrigerant mass in the high pressure part of the system 21 and decreasing the pressure in the high pressure part of the system 21. Decreasing the displacement of the expansion machine 27 allows less refrigerant to pass through the expansion machine 27, increasing the instantaneous refrigerant mass in the high pressure part of the system 21 and increasing the pressure in the high pressure part of the system 21.

After expansion in the expansion machine 27, the refrigerant flow enters a separator tank 30 which separates the refrigerant into vapor and liquid. The vapor refrigerant enters a recompressor 32 that recompresses the vapor refrigerant. The recompressed vapor refrigerant is injected along a path 35 at any higher pressure component of the system 21. The recompressor 32 is directly linked to the expansion machine 27 by line 34. In one example, the recompressed flow is injected at the inlet of the gas cooler 24 As shown in FIG. 3A, the recompressor 32 and the expansion machine 27 are separate components.

The energy recovered by the expansion process is used to recompress the vapor phase of the expanded flow in the recompressor 32. The energy recovered by the expansion machine 27 can also be used to decrease the energy requirements of the system 21, increasing system 21 efficiency. The power requirements of the recompressor 32 are a function of the amount of the refrigerant flow through to the recompressor 32, the displacement of the recompressor 32, the pressure differential between the inlet and the outlet of the recompressor 32 and the efficiency of the recompressor 32.

By controlling the amount of refrigerant flow provided to the recompressor 32, the massflow rate of refrigerant through the expansion machine 27 can be controlled. The refrigerant flow through the recompressor 32 is a function of the refrigerant density at the inlet of the recompressor 32, the displacement of the recompressor 32, and the speed of the recompressor 32. By regulating of any these functions, the refrigerant flow through the recompressor 32, the load on the expansion machine 27, the speed of the expansion machine 27, and therefore the flowrate through the expansion machine 27 can be regulated.

A first valve 36 having an orifice and positioned between the expanded flow and the inlet of the recompressor 32 is controlled to regulate the amount of flow provided to the recompressor 32. The first valve 36 is controlled by a control 38 and is actuated by increasing or decreasing the diameter of the orifice. The control 38 monitors the high pressure in the gas cooler 24 and adjusts the actuation of the first valve 36 to achieve the optimal pressure. The control 38 may be the main control for cycle 21. Once the desired pressure has been determined, the control 38 adjusts the first valve 36 to regulate the high pressure. The factors used to determine the optimum pressure are within the skill of a worker in the art. By regulating the high pressure in the gas cooler 24, the enthalpy of the refrigerant at the entry of the evaporator 28 can be modified, controlling the capacity and/or efficiency of the system 20.

If the pressure in the gas cooler 24 is below the optimal pressure, the efficiency of the system 21 could be increased. The control 38 opens or increases the size of the orifice in the first valve 36, increasing the amount of flow provided to the recompressor 32 and the load on the expansion machine 27. The amount of refrigerant flow through the expansion machine 27 decreases, increasing the instantaneous mass in the supercritical part of the system 21 and the supercritical pressure.

If the pressure in the gas cooler 24 is above the optimal pressure, an excessive amount of energy is used to compress the refrigerant. The control 38 closes or decreases the size of the orifice in the first valve 36, decreasing the amount of flow provided to the recompressor 32 and the load on the expansion machine 27. The amount of flow through the expansion machine 27 increases, decreasing the instantaneous mass in the supercritical part of the system 21 and the supercritical pressure.

The system 21 can also include a second valve 40 positioned between the expanded flow and the evaporator 28 and operate as an economized cycle. The second valve 40 controls the superheat at the suction of the compressor 22 and varies the mass flowrate through the evaporator 28. By closing the second valve 40, the vapor flow in the separator tank 30 bypasses the evaporator 28 through a vapor bypass line 42 to the suction of the compressor 22.

Figure 3B:
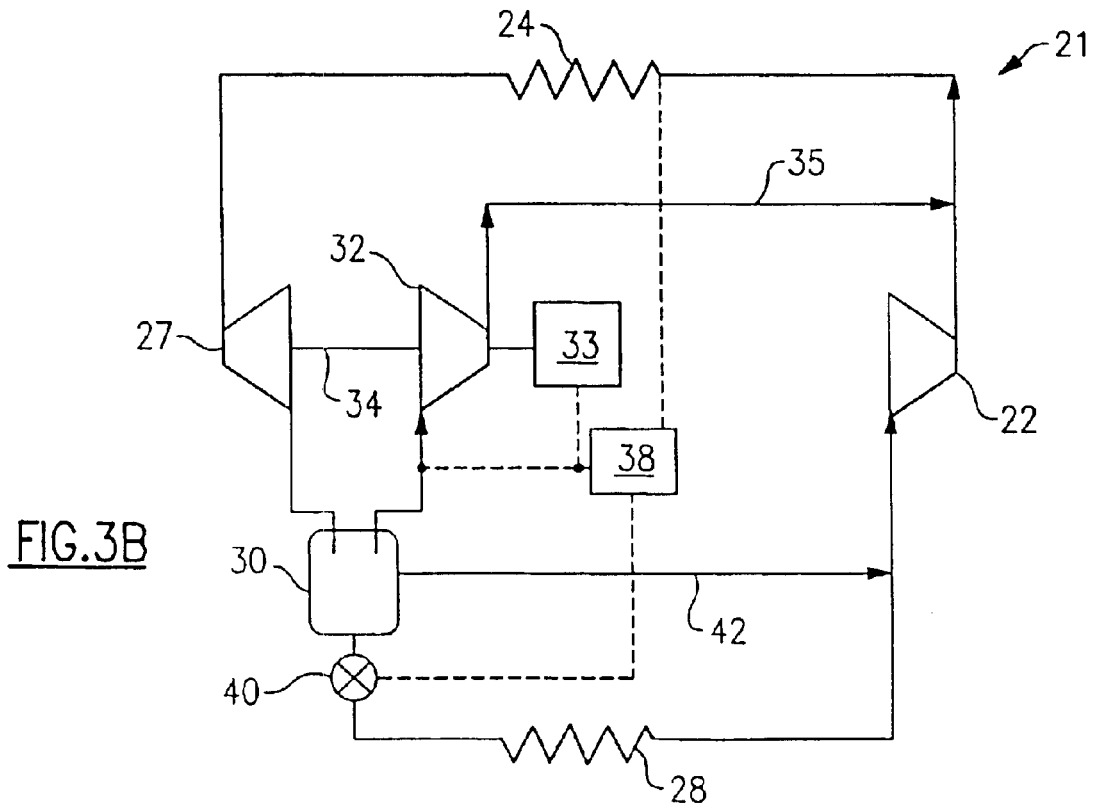
FIG. 3b illustrates a schematic diagram of a first example of the transcritical vapor compression system including a recompressor regulated by a motor to regulate the expander machine flowrate to control the high pressure component of the system.

As shown in FIG. 3b, the amount of refrigerant flow through the recompressor 32 can be regulated by employing and regulating a motor 33 that provides power to the recompressor 32. The speed of the motor 33 is controlled by the control 38. The control 38 monitors the high pressure in the gas cooler 24 and adjusts the speed of the motor 33 to achieve the optimal pressure. If the motor 33 is employed to regulate the flowrate through the expansion machine 27, the first valve 36 is not necessary.

If the control 38 detects that the pressure in the gas cooler 24 is below the optimal pressure, the control 38 decreases the speed of the motor 33, decreasing the speed and flowrate through the recompressor 32 and the expansion machine 27. When the expansion machine 27 flowrate is decreased, the instantaneous mass in the supercritical part of the system 21 increases, increasing the supercritical pressure in the system 21. If the control detects that the pressure in the gas cooler 24 is above the optimal pressure the control 38 increases the speed of the motor 33, increasing the speed and flowrate through the recompressor 32 and the expansion machine 27. When the expansion machine 27 flowrate is increased, the instantaneous mass in the supercritical part of the system 21 decreases, decreasing the supercritical pressure in the system 21.

Figure 4A:
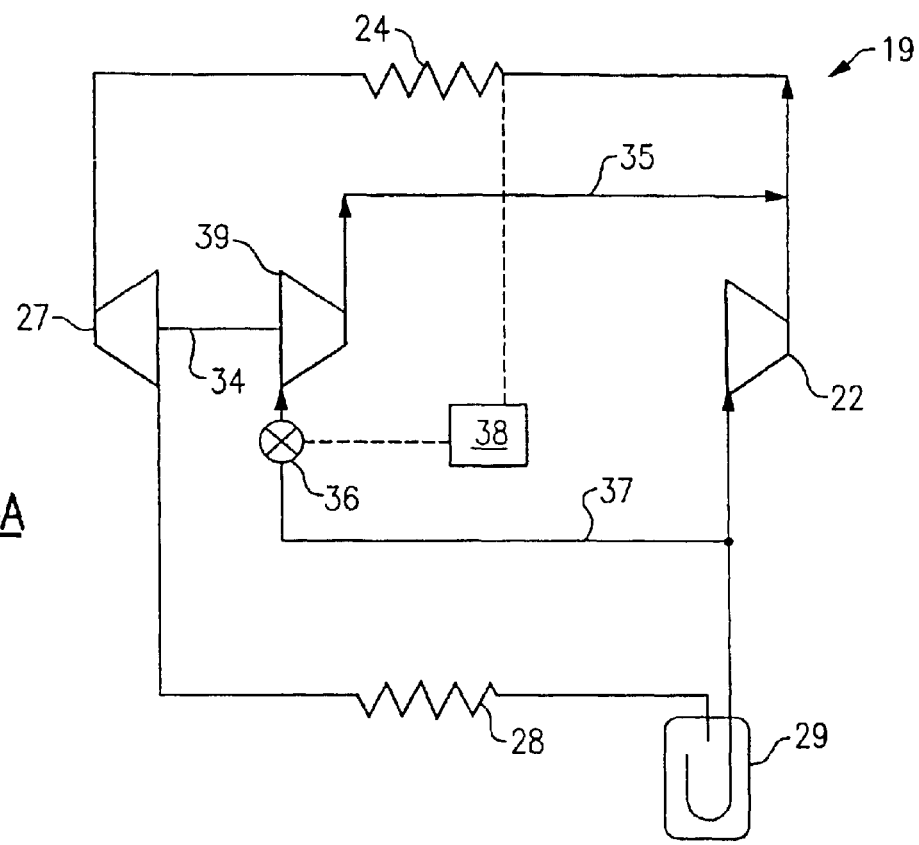
FIG. 4a illustrates a schematic diagram of a second example of a transcritical vapor compression system including a recompressor to regulate the expander machine flowrate to control the high pressure component of the system.

FIG. 4a schematically illustrates a second example of the system 19. The system 19 includes a second compressor 39 in parallel to the main compressor 22. The refrigerant flow to the second compression device 39 is drawn along a path 37 from the suction of the compressor 22 before or after a suction accumulator 29. The flowrate of the expansion machine 27, and thus the pressure in the supercritical portion of the system 19, can be regulated by regulating the flow to the second compression device 39. The flow to the second compression device 39 is regulated by operating the first valve 36 which controls the speed of the expansion machine 27.

Figure 4B:
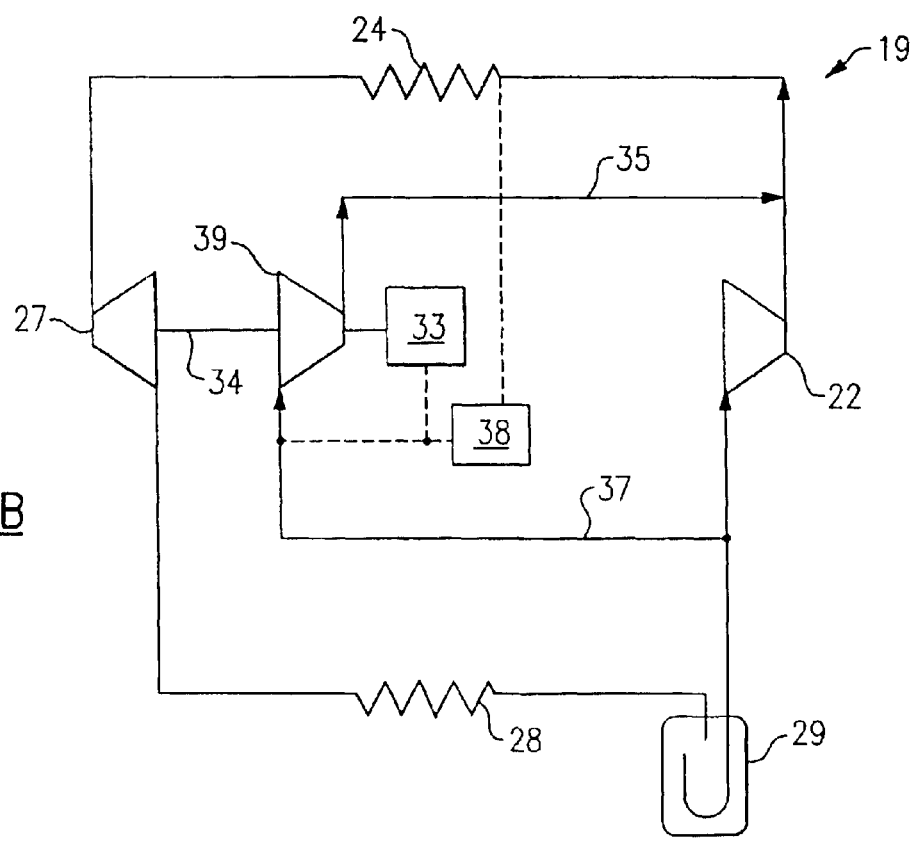
FIG. 4b illustrates a schematic diagram of a second example of a transcritical vapor compression system including a recompressor regulated by a motor to regulate the expander machine flowrate to control the high pressure component of the system.

Alternately, as shown in FIG. 4b, the flow of the second compression device 39 is regulated by controlling the speed of the motor 33, as described for the system 21. If the system 19 includes a motor 33, the first valve 36 is not needed. The system 19 can also include a storage tank or accumulator 29 which contains the excess charge in the system 19.

Figure 5A:
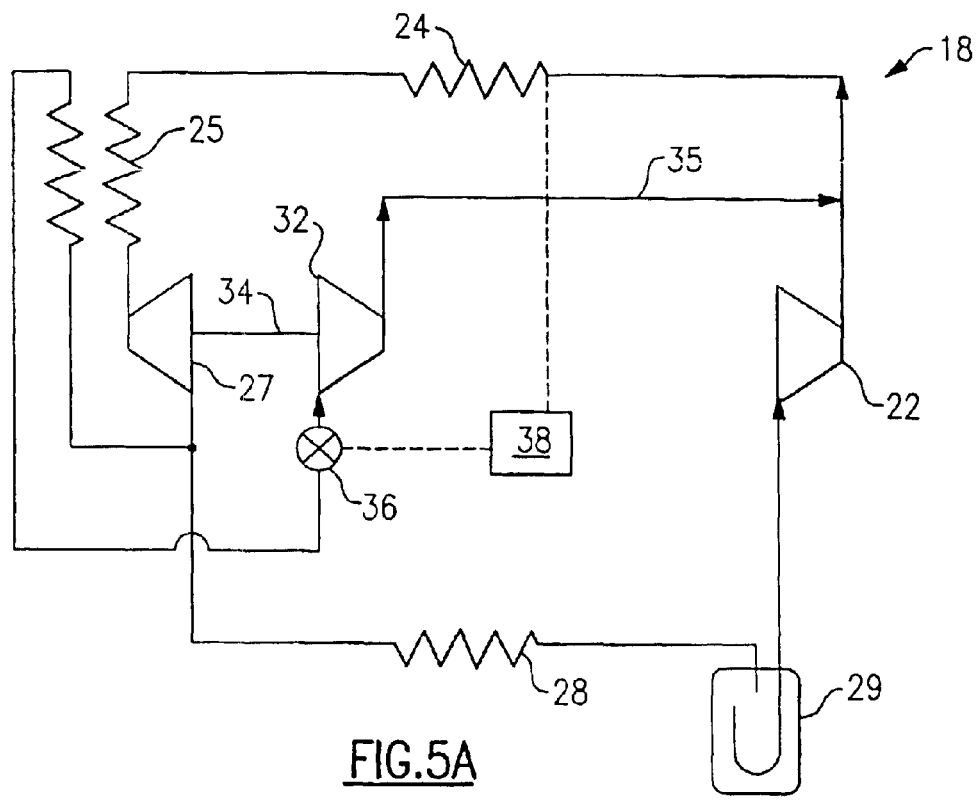
FIG. 5a illustrates a schematic diagram of a third example of a transcritical vapor compression system including a recompressor to regulate the expander machine flowrate to control the high pressure component of the system.

A third example of the invention is schematically illustrated as the system 18 in FIG. 5a. In this example, the flow drawn from the discharge of the expansion machine 27 exchanges heat with the flow provided to the expansion machine 27 in a heat exchanger 25, allowing the liquid in the flow to be vaporized while providing a cooling benefit to the flow leaving the gas cooler 24. This flow is then provided to the recompressor 32. The flowrate of the expansion machine 27, and therefore the pressure in the supercritical portion of the system 18, is regulated by regulating the flow to the recompressor 32. The flow to the recompressor 32 is regulated by operating the first valve 36, which can be located before or after the heat exchanger 25.

Figure 5B:
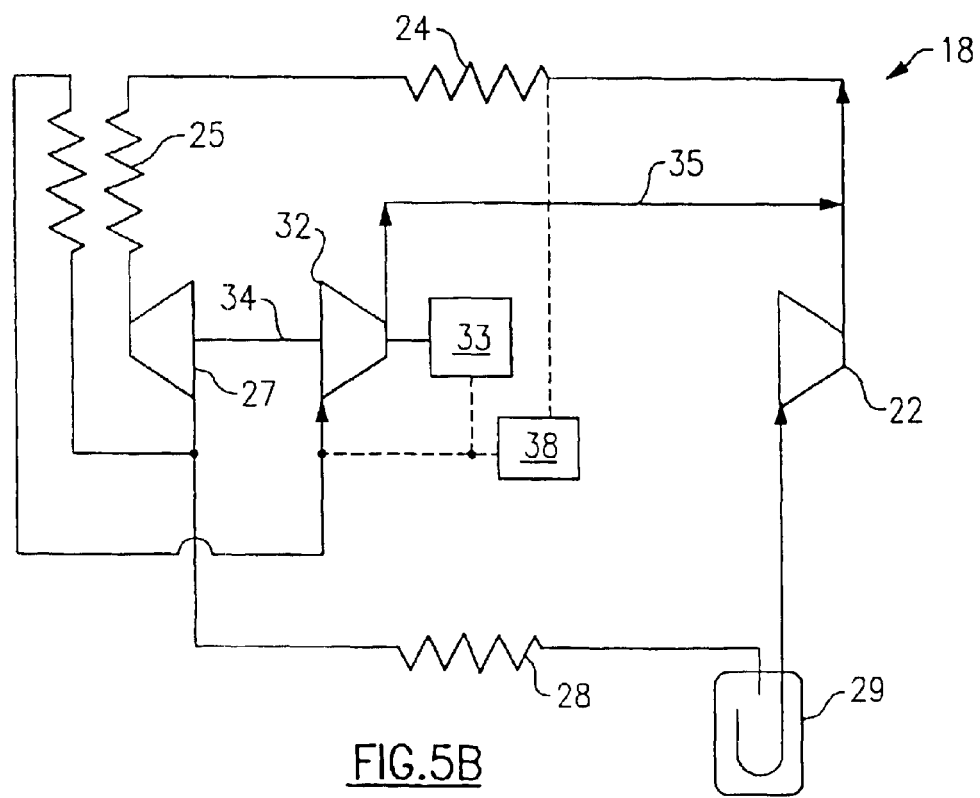
FIG. 5b illustrates a schematic diagram of a third example of a transcritical vapor compression system including a recompressor regulated by a motor to regulate the expander machine flowrate to control the high pressure component of the system.

Alternately, as shown in FIG. 5b, the flow to the recompressor 32 is regulated by controlling the speed of a motor 33, as described for system 21. If the system 18 includes a motor 33, the first valve 36 is not needed. The system 18 can also include a storage tank or accumulator 29 which contains the excess charge in the system 18.

Although a number of examples of the invention have been disclosed and illustrated, it is to be understood that the flowrate of the expansion machine 27 can be varied in other methods. One skilled in the art would know how to adjust the flowrate through the expansion machine 27.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A transcritical vapor compression system comprising:
   a compression device to compress a refrigerant to a high pressure;
   a heat rejecting heat exchanger for cooling said refrigerant;
   an expansion machine for reducing said refrigerant to a low pressure and for recovering energy, said refrigerant flowing through said expansion machine at an expansion machine flowrate, and adjustment of said expansion machine flowrate regulating said high pressure in the system; and
   a heat accepting heat exchanger for evaporating said refrigerant; and
   a recompression device linked to said expansion machine to recompress a portion of said refrigerant exiting said expansion machine, and said portion of said refrigerant is injected at a high pressure component of the system, wherein said portion of said refrigerant flows through said recompression device at a recompression flowrate, and said recompression flowrate is regulated to control said expansion machine flowrate.

2. The system as recited in claim 1 further including a phase separator positioned between said expansion machine and said heat accepting heat exchanger, and said portion of said refrigerant recompressed by said recompression device exits said phase separator and enters said recompression device.

3. The system as recited in claim 1 wherein said heat rejecting heat exchanger includes an inlet, and said high pressure component of the system is said inlet of said heat rejecting heat exchanger.

4. The system as recited in claim 1 further including a first valve positioned between said expansion machine and said recompression device, and said first valve controls said recompression flowrate.

5. The system as recited in claim 4 wherein opening said first valve increases said recompression flowrate, decreases said expansion machine flowrate, and increases said high pressure.

6. The system as recited in claim 4 wherein closing said first valve decreases said recompression flowrate, increases said expansion machine flowrate, and decreases said high pressure.

7. The system as recited in claim 4 further including a control which actuates said first valve.

8. The system as recited in claim 7 wherein said control monitors said high pressure in the system, compares said high pressure to a desired high pressure, and controls said first valve in response to a comparison of said high pressure and said desired high pressure.

9. The system as recited in claim 2 further including a second valve positioned between said phase separator and said heat accepting heat exchanger.

10. The system as recited in claim 1 wherein said refrigerant is carbon dioxide.

11. The system as recited in claim 1 wherein one of a speed of said expansion machine and an operating frequency of said expansion machine controls said expansion machine flowrate.

12. A transcritical vapor compression system comprising:
    a compression device to compress a refrigerant to a high pressure;
    a heat rejecting heat exchanger for cooling said refrigerant;
    an expansion machine for reducing said refrigerant to a low pressure and for recovering energy, said refrigerant flowing through said expansion machine at an expansion machine flowrate, and adjustment of said expansion machine flowrate regulates said high pressure in the system;
    a heat accepting heat exchanger for evaporating said refrigerant;
    a recompression device linked to said expansion machine to recompress a portion of said refrigerant exiting said expansion machine, wherein said portion of said refrigerant flows through said recompression device at a recompression flowrate; and
    a motor that regulates said recompression flowrate.

13. A transcritical vapor compression system comprising:
    a compression device to compress a refrigerant to a high pressure;
    a heat rejecting heat exchanger for cooling said refrigerant;
    an expansion machine for reducing said refrigerant to a low pressure and for recovering energy, said refrigerant flowing through said expansion machine at an expansion machine flowrate, and adjustment of said expansion machine flowrate regulates said high pressure in the system;
    a heat accepting heat exchanger for evaporating said refrigerant; and
    a second compression device in parallel with said compression device, and said compression device compresses a first portion of said refrigerant flowing from said heat accepting heat exchanger and said second compression device compresses a second portion of said refrigerant flowing from said heat accepting heat exchanger, wherein said second compression device is linked to said expansion machine to compress said second portion of said refrigerant, and said second portion of said refrigerant flows through said second compression device at a second recompression flowrate that is regulated to control said expansion machine flowrate.

14. The system as recited in claim 13 further including a first valve positioned between said heat accepting heat exchanger and said second compression device, and said first valve controls said second compressor flowrate.

15. The system as recited in claim 1 wherein said refrigerant from said heat rejecting heat exchanger exchanges heat with said refrigerant from said expansion machine in a heat exchanger, and said recompression device recompresses said refrigerant from said heat exchanger, and a recompression flowrate of said refrigerant flowing through said recompression device is regulated to control said expansion machine flowrate.

16. The system as recited in claim 1 wherein said expansion machine flowrate is regulated by regulating a displacement of said expansion machine.

17. The system as recited in claim 1 wherein said recompression flowrate is regulated by regulating a speed of said recompression device.

18. The system as recited in claim 1 wherein said recompression flowrate is regulated by regulating a displacement of said recompression device.

19. The system as recited in claim 1 wherein said recompression flowrate is regulated by regulating a suction density of said recompression device.

20. A method of regulating a high pressure of a transcritical vapor compression system comprising die steps of:

compressing a refrigerant to the high pressure;

cooling the refrigerant;

expanding the refrigerant to a low pressure in an expansion machine, wherein the refrigerant flows though the expansion machine at an expansion machine flowrate;

evaporating the refrigerant;

controlling the expansion machine flowrate of said refrigerant flowing through the expansion machine to regulate the high pressure of the refrigerant;

recompressing a portion of the refrigerant exiting the expansion machine in a recompressor that is linked to the expansion machine, wherein the refrigerant flows through the recompression device at a recompression flowrate, and the recompression flowrate is regulated to control the expansion machine flowrate; and injecting the portion of the refrigerant flowing from the recompressor at a high pressure component of the system.

21. The method as recited in claim 20 further including the step of regulating the expansion machine flowrate by regulating one of a speed the expansion machine and an operating frequency of the expansion machine.

22. The method as recited in claim 20 wherein the expansion machine flowrate is related to the recompression flowrate.

23. The system as recited in claim 1 wherein said expansion machine and said recompression device are separate components.

* * * * *